United States Patent
Houghson

(10) Patent No.: US 10,172,468 B2
(45) Date of Patent: Jan. 8, 2019

(54) ADJUSTABLE PORTABLE HEADREST

(71) Applicant: Glenn Scott Houghson, Holly, NY (US)

(72) Inventor: Glenn Scott Houghson, Holly, NY (US)

( * ) Notice: Subject to any disclaimer, the term of this patent is extended or adjusted under 35 U.S.C. 154(b) by 0 days.

(21) Appl. No.: 15/611,916

(22) Filed: Jun. 2, 2017

(65) Prior Publication Data
US 2017/0354263 A1 Dec. 14, 2017

Related U.S. Application Data

(60) Provisional application No. 62/349,734, filed on Jun. 14, 2016.

(51) Int. Cl.
*A47C 16/00* (2006.01)
*F16M 11/28* (2006.01)

(52) U.S. Cl.
CPC ............ *A47C 16/00* (2013.01); *F16M 11/28* (2013.01)

(58) Field of Classification Search
CPC .................................. A47C 16/00; F16M 11/28
USPC .... 297/4, 392, 393, 423.39, 423.41, 423.44, 297/423.45
See application file for complete search history.

(56) References Cited

U.S. PATENT DOCUMENTS

| | | | | |
|---|---|---|---|---|
| 245,639 A * | 8/1881 | Lay | ........ | B60N 2/4879 297/394 |
| 306,685 A * | 10/1884 | Hecox | ........ | A61G 17/04 297/392 X |
| 973,957 A * | 10/1910 | Neff | ........ | B60N 2/882 297/394 |
| 1,134,720 A * | 4/1915 | Bradley | ........ | A61G 7/065 297/392 X |
| 1,260,929 A * | 3/1918 | Maxcy | ........ | B60N 2/4879 297/394 |
| 1,417,250 A * | 5/1922 | Kelly | ........ | A61F 5/02 135/65 |
| 1,961,244 A * | 6/1934 | Pottern | ........ | A45D 19/08 4/523 |
| 2,120,310 A * | 6/1938 | Duncan | ........ | A01N 1/00 248/124.1 |

(Continued)

FOREIGN PATENT DOCUMENTS

WO  WO/2004/084671 A1  10/2004
WO  WO/2010/105534 A1  9/2010

(Continued)

*Primary Examiner* — Rodney B White
(74) *Attorney, Agent, or Firm* — Andrew Morabito

(57) ABSTRACT

A portable adjustable headrest comprising a base member having on opening and a plurality of tabs, at least two elongated pads having a first end and a second end, wherein the second end has a tab affixed, and the at least two elongated pads are rotationally attached to the first attachment member and the second attachment member by the tabs, an outer shaft secured to the receiving orifice, an inner shaft having a first end and a second end and a central axis, configured to fit securely within the outer shaft in a telescopic relationship, a locking mechanism coupled to the inner shaft and the outer shaft, a cushion base attached to the first end of the inner shaft, wherein the cushion base has an elongated surface, and a cushion situated on the elongated surface of the cushion base.

10 Claims, 5 Drawing Sheets

(56) References Cited

U.S. PATENT DOCUMENTS

| | | | | |
|---|---|---|---|---|
| 2,172,178 A * | 9/1939 | Rosenberg | A47C 16/00 | 135/69 |
| 2,473,947 A * | 6/1949 | Hamstrom | B60N 2/62 | 297/423.45 X |
| 2,800,164 A * | 7/1957 | Chambers | A45B 5/00 | 248/155.1 |
| 2,818,577 A * | 1/1958 | Kubik | A47K 3/125 | 297/423.45 X |
| 3,161,435 A * | 12/1964 | Halverson | B60N 2/62 | 297/423.39 X |
| 3,467,033 A * | 9/1969 | Remer | A47C 9/10 | 108/115 |
| 3,497,293 A * | 2/1970 | Davis | A45B 5/00 | 359/862 |
| 3,544,161 A * | 12/1970 | Bryden | A47C 7/543 | 297/391 |
| 3,929,309 A * | 12/1975 | De Vore | A47C 1/10 | 248/118 |
| 4,098,478 A * | 7/1978 | Spitzke | A47C 9/10 | 297/4 X |
| 4,154,478 A | 5/1979 | Cohune | | |
| 4,249,712 A * | 2/1981 | DeLong | B44D 3/00 | 248/118 |
| 4,366,981 A * | 1/1983 | Ziegler | A47C 9/025 | 297/4 X |
| 4,451,080 A * | 5/1984 | Nix | A61H 3/00 | 297/4 X |
| 4,565,409 A * | 1/1986 | Hollonbeck | A47C 16/00 | 297/411.1 |
| 4,865,382 A * | 9/1989 | Marshall | A47C 9/025 | 248/157 |
| 5,303,890 A * | 4/1994 | Carruth | A47C 20/026 | 248/118 |
| 5,408,713 A * | 4/1995 | Stratton | A47C 16/00 | 5/622 |
| 5,470,038 A * | 11/1995 | Clark | A45B 5/00 | 248/156 |
| 5,560,573 A * | 10/1996 | Colver | F16M 11/046 | 248/118 |
| 5,927,797 A * | 7/1999 | Ferguson | A47C 7/022 | 297/4 |
| 6,062,638 A * | 5/2000 | Ferguson | A47C 9/025 | 297/4 |
| 6,089,515 A * | 7/2000 | McGlew | B62J 99/00 | 248/118 |
| 6,123,389 A | 9/2000 | O'connor | | |
| 6,151,734 A * | 11/2000 | Lawrie | A47C 20/026 | 5/622 |
| 6,270,160 B1 * | 8/2001 | Blake | A47C 16/00 | 297/393 |
| 6,427,273 B1 * | 8/2002 | Berke | A47C 16/00 | 248/118 |
| 6,648,416 B2 | 11/2003 | O'connor | | |
| 6,893,097 B1 * | 5/2005 | Ebensperger | A47C 9/10 | 297/4 X |
| 6,997,511 B2 * | 2/2006 | Marchand | A47C 9/025 | 297/313 |
| 7,036,168 B1 * | 5/2006 | Knickerbocker | A47G 9/10 | 5/636 |
| 7,044,267 B2 * | 5/2006 | Sigler | A47C 16/00 | 182/15 |
| 7,140,086 B2 * | 11/2006 | Heaton | E03C 1/2665 | 29/271 |
| 7,325,868 B2 * | 2/2008 | West | A47C 16/00 | 297/4 |
| 7,396,083 B2 * | 7/2008 | Kasner | A01K 97/00 | 297/4 X |
| 7,594,696 B2 * | 9/2009 | Girard | A47C 9/025 | 297/130 |
| 7,673,836 B2 * | 3/2010 | Wallock | A47C 16/00 | 248/118 |
| 7,726,729 B2 * | 6/2010 | Groll | A47C 9/025 | 297/4 X |
| 7,740,308 B2 * | 6/2010 | Mishly | A47C 3/34 | 135/66 |
| 7,748,064 B2 | 7/2010 | Hamilton | | |
| 7,938,491 B2 | 5/2011 | Montuore | | |
| 8,007,044 B1 | 8/2011 | Dubey | | |
| 8,042,775 B1 * | 10/2011 | Gallegos | A47C 16/00 | 248/118 |
| 8,052,110 B2 * | 11/2011 | Wang | E04G 25/06 | 248/354.3 |
| 8,172,328 B2 | 5/2012 | Ferro | | |
| 8,403,408 B2 * | 3/2013 | Hosler | A47C 9/025 | 297/4 |
| 8,528,970 B2 | 9/2013 | Edalati | | |
| 8,528,978 B2 | 9/2013 | Purpura | | |
| 8,726,421 B2 | 5/2014 | Alvarez | | |
| 8,850,642 B2 | 10/2014 | Rasmussen | | |
| 8,985,693 B2 | 3/2015 | Purpura | | |
| 9,150,130 B2 * | 10/2015 | Jackow | B60N 2/4805 | |
| 9,226,587 B2 | 1/2016 | Hamlimi | | |
| 9,301,621 B2 * | 4/2016 | Barstad | A47C 4/022 | |
| 9,656,581 B2 * | 5/2017 | Brecht | B64D 11/0646 | |
| 9,715,869 B1 * | 7/2017 | Sorenson | F16M 11/28 | |
| 9,770,110 B1 * | 9/2017 | Biggs | A47C 7/383 | |
| 9,782,317 B2 * | 10/2017 | Mount | A47C 7/38 | |
| 9,803,798 B1 * | 10/2017 | Rockhill | F16M 13/02 | |
| 9,877,588 B2 * | 1/2018 | Belleh | A47C 16/00 | |
| 9,924,802 B2 * | 3/2018 | Mills | B60N 2/806 | |
| 2002/0050009 A1 * | 5/2002 | Ley | A47C 16/00 | 5/657 |
| 2003/0038521 A1 | 2/2003 | Johnson | | |
| 2004/0155507 A1 | 8/2004 | Carta Gonzalez | | |
| 2005/0242630 A1 * | 11/2005 | Miller | A01K 97/00 | 297/4 |
| 2006/0244300 A1 | 11/2006 | Watson Savage | | |
| 2009/0250088 A1 * | 10/2009 | Gibbons | A61H 3/02 | 135/73 |
| 2010/0026078 A1 * | 2/2010 | Abdoli-Eramaki | A47C 1/022 | 297/464 |
| 2010/0155346 A1 | 6/2010 | Chen | | |
| 2010/0180382 A1 | 7/2010 | Hunter | | |
| 2011/0169316 A1 | 7/2011 | Goei | | |
| 2011/0277238 A1 | 11/2011 | Mabry | | |
| 2012/0261965 A1 * | 10/2012 | Elizalde | A47C 1/10 | 297/391 |
| 2013/0152828 A1 * | 6/2013 | Chavira | A47B 85/06 | 108/12 |
| 2013/0341367 A1 | 12/2013 | Purpura | | |
| 2014/0033439 A1 * | 2/2014 | Berhanu | A47C 16/00 | 5/640 |
| 2014/0312186 A1 * | 10/2014 | Mech | A47C 20/026 | 248/118 |
| 2014/0312673 A1 | 10/2014 | Chen | | |
| 2015/0001905 A1 | 1/2015 | Jackow | | |
| 2016/0081445 A1 | 3/2016 | Chen | | |
| 2016/0081482 A1 * | 3/2016 | Schumacher | A47C 7/383 | 5/640 |
| 2016/0113407 A1 * | 4/2016 | Sampson | A47C 7/383 | 297/397 |
| 2016/0192780 A1 * | 7/2016 | Sinclair | A47C 4/04 | 297/195.11 X |
| 2016/0331126 A1 * | 11/2016 | Mills | | |
| 2017/0112291 A1 * | 4/2017 | Trucco | A47C 16/00 | |
| 2017/0215588 A1 * | 8/2017 | Trucco | A47C 16/00 | |
| 2018/0084919 A1 * | 3/2018 | Rayburn | A47C 7/383 | |

FOREIGN PATENT DOCUMENTS

| | | |
|---|---|---|
| WO | WO/2013/086923 A1 | 6/2013 |
| WO | WO/2014/108097 A1 | 7/2014 |
| WO | WO/2015/154685 A1 | 10/2015 |

* cited by examiner

ADJUSTABLE PORTABLE HEADREST

BACKGROUND

The present invention relates generally to the field of support devices, and more particularly to an adjustable portable head rest.

When someone is travelling on an airplane, a train, a bus, a car, a fairy or the like, the transportation vehicle generally only provide recumbent support for the neck and head. The person is generally limited to the seated position. The space for the person to sit in is generally a confined space, making it difficult for the person to find a comfortable position to sleep, or rest comfortably. The person often must lean their head in a position that is uncomfortable making it difficult to sleep or rest, particularly for extended periods of time. Thus, making it difficult to find a comfortable position for the person rest or relax.

Formed pillows, headrests, and lap devices are used to aid in the reduction of neck and back strain. These devices require the person's head and neck to remain in a position that can be uncomfortable and in an upright position. The devices do not allow for the person to position themselves in various ways because of the designs. Where the person's neck cannot completely relax. These devices are made as a one-size-fits-all and thus are not ideal for people that are not within this average size that the devices are made for.

Thus, it is desired to have a device provides proper support for the person's head and neck, allows for various different sleeping positions, and for adjustability so people are varying heights are able to all use the same device comfortably.

SUMMARY

According to one aspect of the present invention is a portable adjustable headrest comprising a base member having on opening and a plurality of tabs, at least two elongated pads having a first end and a second end, wherein the second end has a tab affixed, and the at least two elongated pads are rotationally attached to the first attachment member and the second attachment member by the tabs, an outer shaft secured to the receiving orifice, an inner shaft having a first end and a second end and a central axis, configured to fit securely within the outer shaft in a telescopic relationship, a locking mechanism coupled to the inner shaft and the outer shaft, a cushion base attached to the first end of the inner shaft, wherein the cushion base has an elongated surface, and a cushion situated on the elongated surface of the cushion base.

Further areas of applicability will become apparent from the description provided herein. It should be understood that the description and specific examples are intended for purposes of illustration only and are not intended to limit the scope of the claims.

DETAILED DESCRIPTION

The present invention relates to a headrest which allows a person when in a seated position to have a headrest that is versatile and allows the person to rest their head and neck in a position that is desired for them. The headrest utilizes the weight of the user to offer neck and shoulder support in a variety of positions that are specific to each user. The headrest has an adjustable height and a rotated pillow to allow for various positions and heights so that the person can find the ideal position for themselves. This is helpful for users that have a difficult time finding a comfortable position when traveling.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein may also be used in the practice or testing of the present invention, the preferred methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Figure 1:
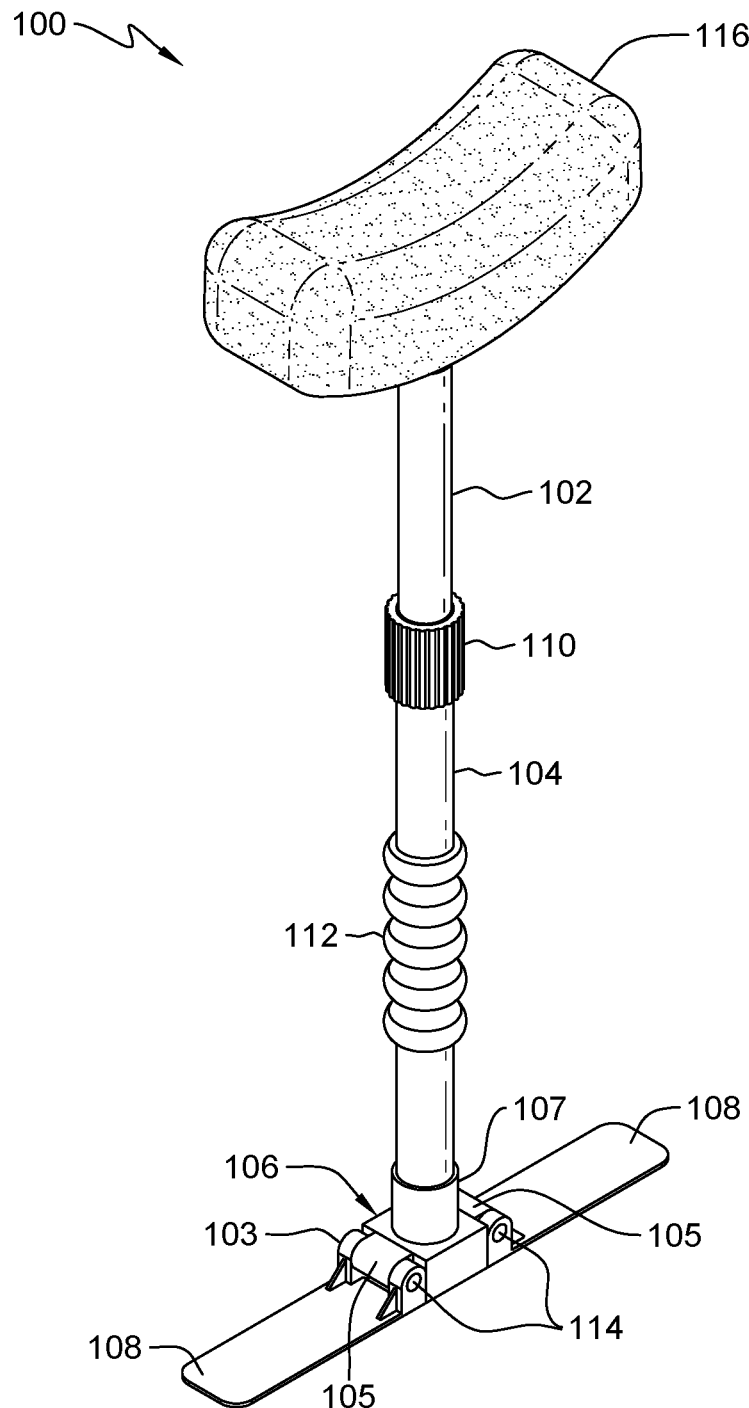
FIG. 1 depicts a perspective view of an adjustable portable headrest in an open position, in accordance with one embodiment of the present invention.

FIG. 1 depicts a perspective view of an adjustable portable headrest 100 in an open position, in accordance with one embodiment of the present invention. The depicted embodiment of the adjustable portable headrest 100 is comprised of a pillow case 116, an inner shaft 102, an outer shaft 104, a base connector 106, pads 108, locking mechanism 110, grip 112, and pins 114.

The inner shaft 102 supports a cushion and is telescopically attached to the outer shaft 104. In some embodiments, the inner shaft 102 may be extended and rotated about a center line. The inner shaft 102 is a predetermined length and diameter to allow for a variety of heights so a greater diversity of people of varying heights may use the adjustable portable headrest 100. The diameter of the inner shaft 102 is sized to be received by the outer shaft 104. In the depicted embodiment, the first and second shaft members 102 and 104 are substantially circular. In additional embodiments, the first and second shaft members 102 and 104 may have various other shapes, such as, but not limited to, oval, rectangular, or square. In the depicted embodiment, the inner shaft 102 is twelve (12) inches long. The inner shaft 102 may be made from, but not limited to, aluminum, steel, iron, copper, brass, bronze, zinc, stainless steel, polyolefins, styrenics, polypropylene, copolymer polypropylene, polystyrene, thermoplastic elastomers, thermoplastic elastomers, polyethylene, polypropylene, polystyrene, copolymer polypropylene, or the like. The inner shaft 102 may be hollow or solid.

The outer shaft 104 is designed to support the weight of the person using the adjustable portable headrest 100 and receive the inner shaft 102. In the depicted embodiment, the outer shaft 104 is sized to receive the inner shaft 102 with minimal excess space or a gap between the one another. The outer shaft 104 is a predetermined length and thickness. The thickness of the outer shaft 104 shall be adequate to support the weight of a person. The outer shaft 104 may be made from, but not limited to, aluminum, steel, iron, copper, brass, bronze, zinc, stainless steel, polyolefins, styrenics, polypropylene, copolymer polypropylene, polystyrene, thermoplastic elastomers, thermoplastic elastomers, polyethylene, polypropylene, polystyrene, copolymer polypropylene, or the like.

The locking mechanism 110 is designed to lock/hold the inner shaft 102 in a position and height desired by the person. In one embodiment, the locking mechanism 110 hinders the ability for the inner shaft 102 to rotate about a center axis as well as stop the inner shaft 102 from extending upwards or downwards within the outer shaft 104, when the locking mechanism 110 is engaged. In various embodiments, rotational locking or telescopic locking may be accomplished by the locking mechanism 110 but not both. The locking mechanism 110 is designed to be able to lock the inner shaft 102 and has adequate strength to handle the weight of the person or greater. The locking mechanism 110 may be a twist lock, a pressure lock, a cam lock, snap locking mechanism, a screw lock, snap button locks, or other types of locks know to those in the art. The locking mechanism 110 may be made from a metal, plastic, composite, or a combination of these or other types of materials.

The grip 112 is designed to provide a comfortable place for the person to either carry the adjustable portable headrest 100, to provide a comfortable place for the person to grip the adjustable portable headrest 100 when adjusting the height of the cushion, or to hold on to while using the adjustable portable headrest 100. The grip 112 may be placed in a fixed position on the outer shaft 104, or it may be moveable up and down the outer shaft 104. The length, thickness, and contour of the grip 112 may be varied or adjusted to provide a more ergonomic design and structure. The grip 112 may be made from, but not limited to, a foam, vinyl, vynaprene, vynafoam, polysuede, silicone, neoprene, nitrile polyvinyl chloride (NPVC), ethylene propylene diene monomer (EPDM), and other materials known to those in the art.

The connection member 106 is the main portion of the support structure of the adjustable portable headrest 100. The connection member 106 is designed to attach to the pads 108 and the outer shaft 104 and provide adequate structural support. So, when the use adjustable portable headrest 100 is in use it will remain steady and stable.

In the depicted embodiment, the connection member 106 has an upper portion 107 that has an opening designed to receive the outer shaft 104. The tabs 105 are disposed on opposite sides of the connection member 106 so that the pads 108 may be attached. The tabs 105 have an opening extending entirely through the tabs 105 and are sized to receive connection pins 114. In one embodiment, the connection member 106 may be a unitary construction. In additional embodiments, the connection member 106 may be constructed out of numerous parts. The connection member 106 may be made from, but not limited to, polyolefins, styrenics, polypropylene, copolymer polypropylene, polystyrene, thermoplastic elastomers, thermoplastic elastomers, polyethylene, polypropylene, polystyrene, copolymer polypropylene, metals, or various other materials thereof known in the art.

Figure 4:
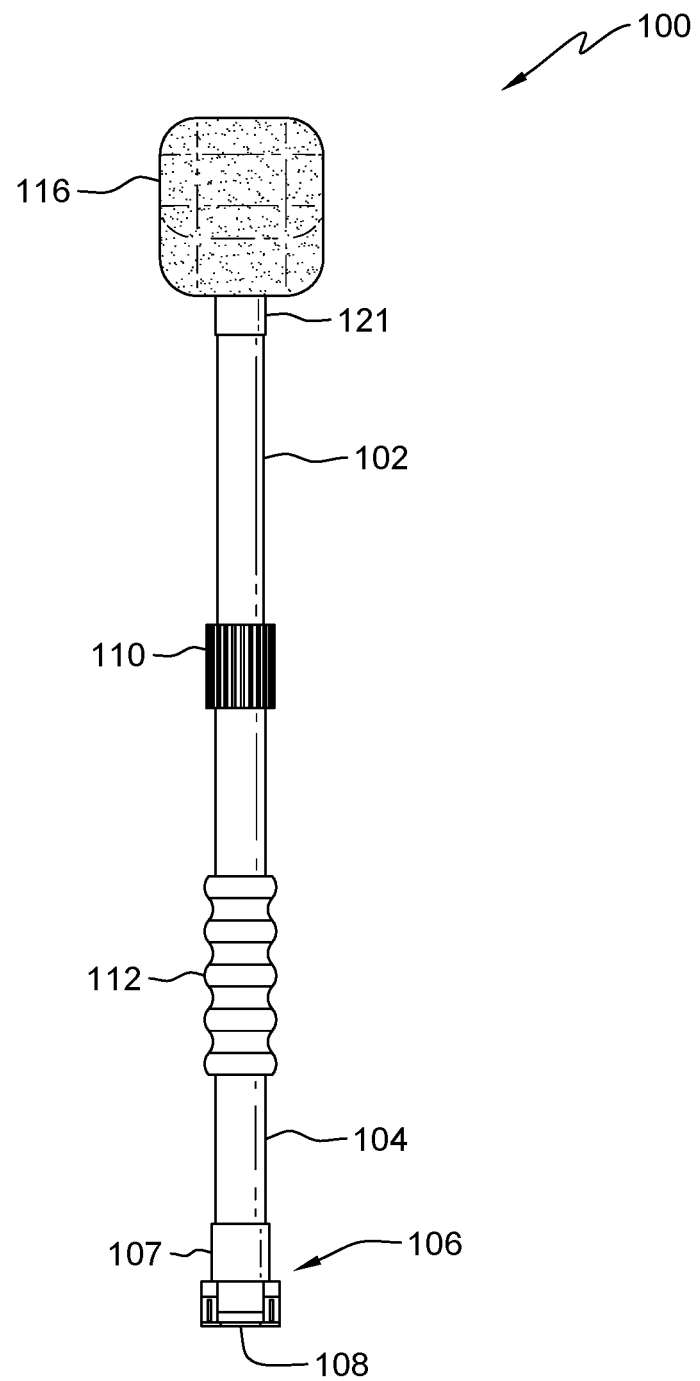
FIG. 4 depicts a side view of the adjustable portable headrest, in accordance with an embodiment of the present invention.

The pads 108 are designed to sit under the person's thighs to provide stability and support, so that when the person is resting their head or body on the cushion. The adjustable portable headrest 100 will not move because the weight of the person is holding the adjustable portable headrest 100 in position. In the depicted embodiment, the pads 108 are flat and a predetermined length, width, and thickness to extend substantially the length of the person's thighs. The pads 108 are attached to the connection member 106 by the projections 103. These projections 103 have an opening extending entirely through the projection and are sized to receive the pin 114. When the pads 108 are attached to the connection member 106 via the projections 103. The pads 108 are able to rotate about the pin 114 (as shown in FIG. 4). In additional embodiments, the projections 103 may be more or less than two (2) to securely attach the pads 108 to the connection member 106.

In some embodiments, the pads 108 may have various curves, thickness, or widths to provide a more ergonomic and stable structure. In additional embodiments, the pads 108 may have a cushion or cover to provide additional support. In additional embodiments, the pads 108 may have a locking mechanism to secure the pads 108 in a desired position. In an additional embodiment, the tabs 108 may have a spring loaded designed. The pads 108 may be made from, but not limited to, polyolefins, styrenics, polypropylene, copolymer polypropylene, polystyrene, thermoplastic elastomers, thermoplastic elastomers, polyethylene, polypropylene, polystyrene, copolymer polypropylene, metals, or various other materials thereof known in the art.

In the depicted embodiment, the openings in the projections 105 and the tabs 107 are substantially aligned to provide an even surface when the pads 108 are extended and a compacted design when the pads 108 are closed. The projections 105 are curved on the upper surface to allow for an uninterrupted rotation about the pin 114.

In the depicted embodiment, the upper portion 107 extends a predetermined distance from the connection member 106 so that there is adequate structural support for the outer shaft 104. The height of the upper portion 107 may be lengthened or shortened to a predetermined length.

The cover 116 is used to protect the cushion as well as provide a soft and comfortable surface to the person to place their hands, neck, face, or other body parts on. The cover 116 is designed to securely fit over the cushion to secure both the cushion and the cover 116. The cover 116 has a fastening means to allow for the cover 116 to be removable. The fastening means may be, but not limited to, hook and loop fasteners, buttons, clasp locker (zip fastener), lace-up, snap buttons, buckles, hook and eye clasps, or various other fastening mechanisms known to those skilled in the art. The cover 116 may be various colors, have various designs or logos imprinted on the cover 116. The cover 116 may be made form, but not limited to, cotton, felt, flannel, satin, winceyette, nylon, velvet, linen, or other fabrics known to those skilled in the art.

Figure 2:
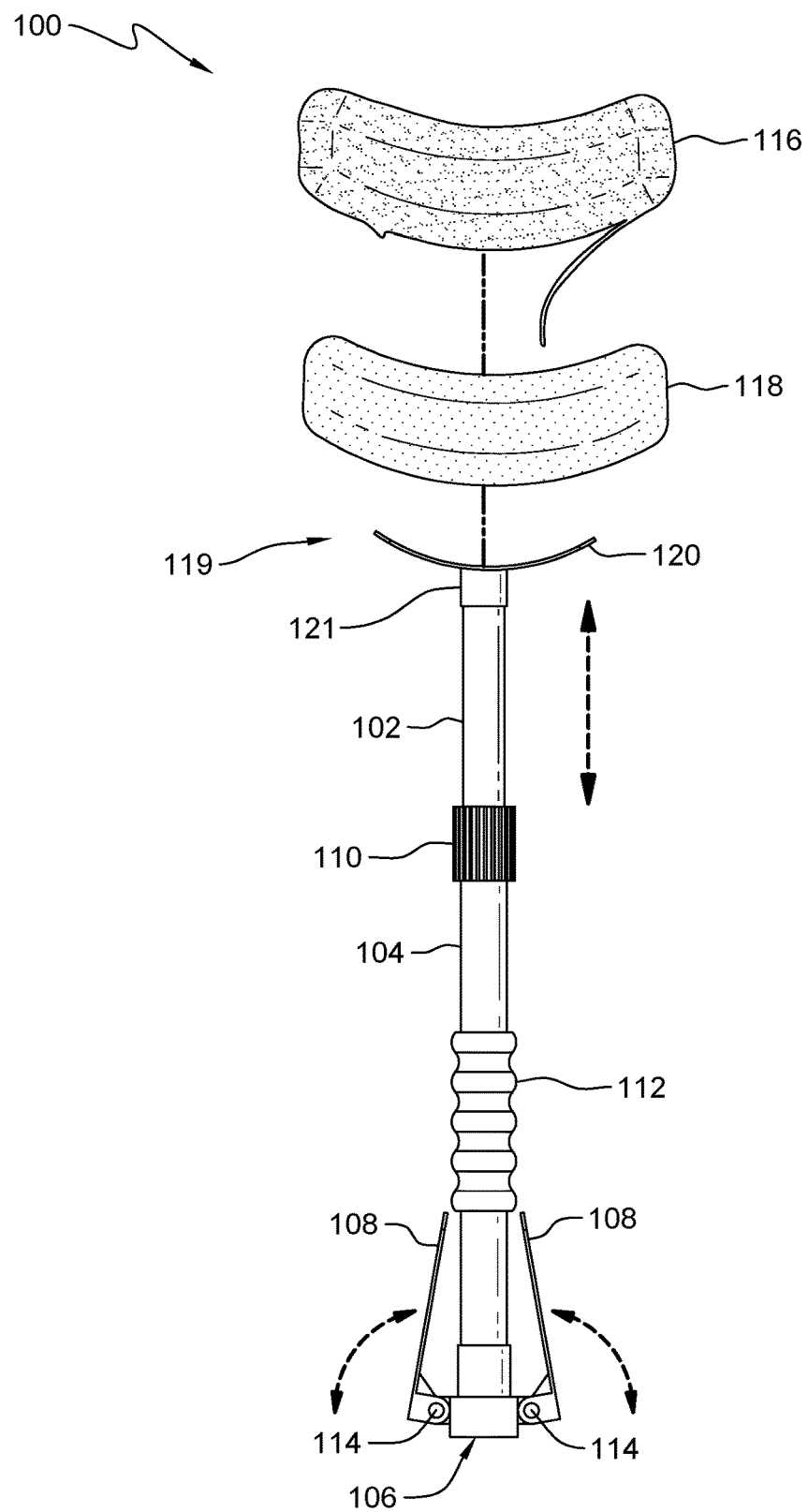
FIG. 2 depicts a front view of the adjustable portable headrest with the headrest removed and the feet in the closed position, in accordance with an embodiment of the present invention.

FIG. 2 depicts the front view of the adjustable portable headrest 100 with a cushion 118 and the cover 116 removed and the feet in the closed position, in accordance with an embodiment of the present invention.

The cushion 118 is designed to provide support for the person's neck, head, arms, or other body part when resting. In the depicted embodiment, the cushion 118 has a concave designed to provide an ergonomic design that also keeps the person's body part from moving. In other embodiments, the curvature of the cushion 118 may have various contours, thicknesses, and lengths to provide a resting position that is specific to the individual person's preferences. The cushion 118 may be made from, but not limited to, visco-elastic, polyurethane foam (memory foam), low-resilience polyurethane foam, high-density memory foams, latex, feather, polyester, gel, or other materials known to those in the art.

The cushion base 119 is designed to provide structural support for the cushion 118 and to support the weight of the person. In the depicted embodiment, the cushion base 119 is comprised of the support surface 120 and the attachment member 121. In some embodiments, the cushion base 119 is detachable from the inner shaft 102.

The support surface 120 provides the structural support for the cushion 118 so that the person can rest their body on the cushion 118 and provide a secure surface for the cover 116 to attach to. In the depicted embodiment, the support surface 120 has a contour and length that is substantially the same as the cushion 118. In additional embodiments, the support surface 120 may have varying contours or lengths. The support surface 120 may be made from, but not limited to, polyolefins, styrenics, polypropylene, copolymer polypropylene, polystyrene, thermoplastic elastomers, thermoplastic elastomers, polyethylene, polypropylene, polystyrene, copolymer polypropylene, or various other forms thereof known in the art. In the depicted embodiment, the width of the cushion 118 is substantially equal to the width of the support surface 120. In additional embodiments, the cushion 118 may be wider or narrower than the support surface 120.

The attachment member 121 secures the support surface 120 to the inner shaft 102. The attachment member 121 is sized to receive the inner shaft 102, and extends a predetermined distance from the bottom surface of the support surface 120 to provide ample support and structural rigidity for the person. In the depicted embodiment, the attachment member 121 and the support surface 120 are a unitary constructed element. In additional embodiments, the attachment member 121 and the support surface 120 are separate elements attached to one another. In the depicted embodiment, the attachment member 121 is substantially centered on the support surface 120. In additional embodiments, the attachment member 121 may be off centered on the support surface 120. In some embodiments, the support surface 120 may be adjustable relative to the attachment member 121.

Figure 3:
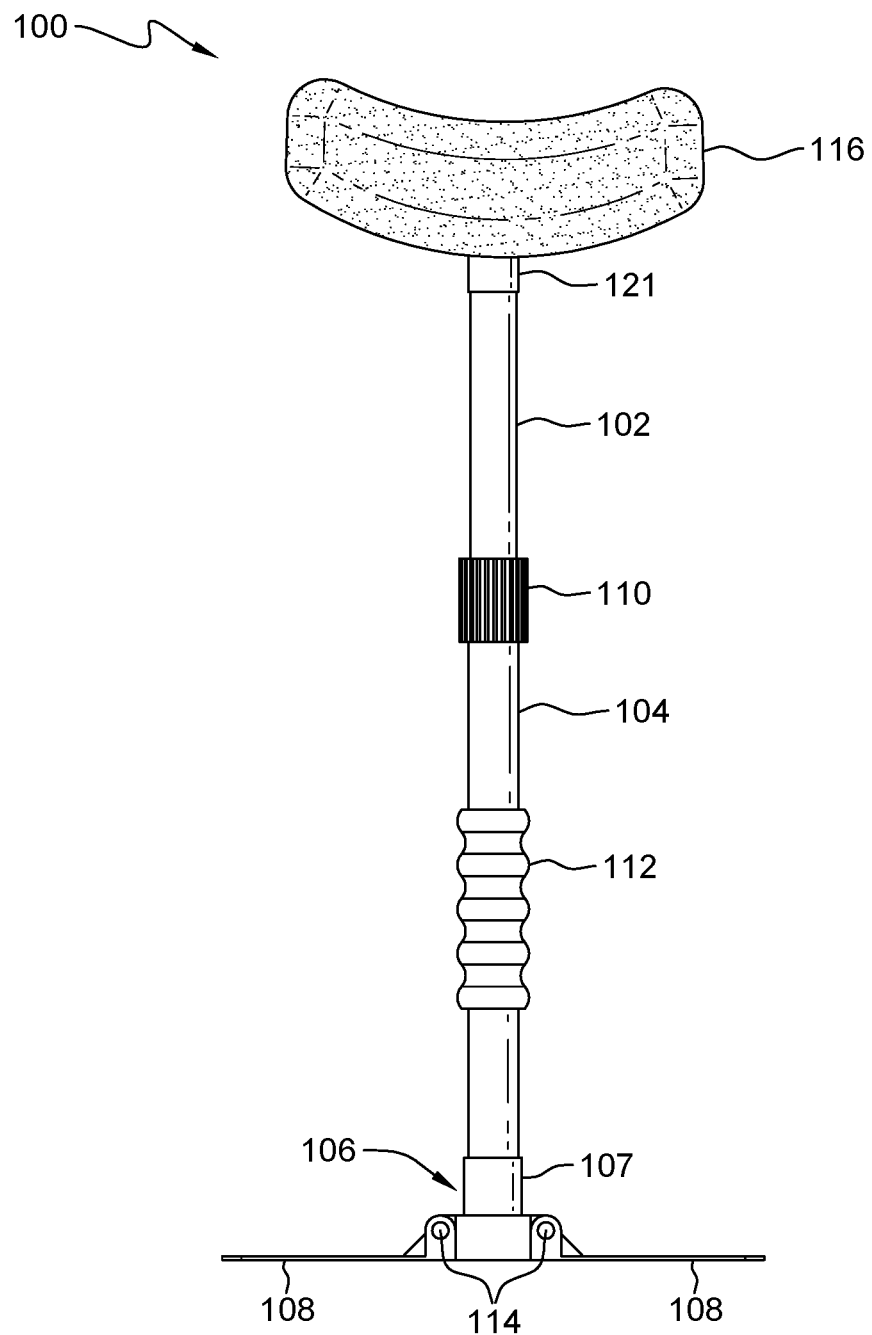
FIG. 3 depicts a front view of the adjustable portable headrest, in accordance with an embodiment of the present invention.

FIG. 3 depicts the front view of the adjustable portable headrest 100, in accordance with an embodiment of the present invention.

FIG. 4 depicts the side view of the adjustable portable headrest 100, in accordance with an embodiment of the present invention. In the depicted embodiment, the pads 108 are the same width as the connection member 106. In additional embodiments, the pads 108 may be wider than the connection member 106.

Figure 5:
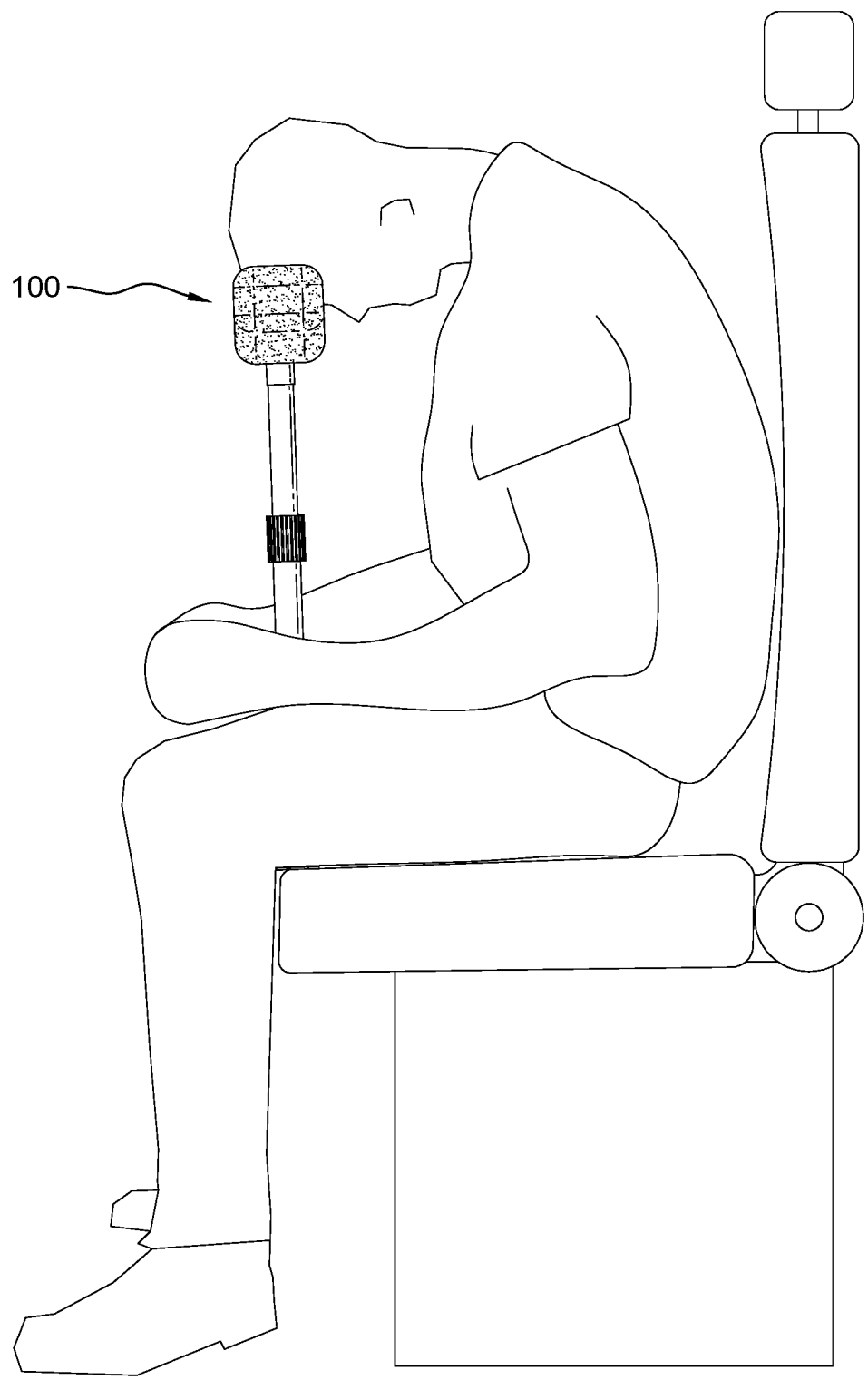
FIG. 5 depict a view of the adjustable portable headrest in use by a person, in accordance with an embodiment of the present invention.

FIG. 5 depict a view of the adjustable portable headrest 100 in use by a person, in accordance with an embodiment of the present invention. In the depicted embodiment, the person is resting their forehead on the cushion 118 while the pads 108 are resting under the person's thighs. Various sleeping positions are capable with the adjustable portable headrest 100 based on the height and position of the cushion 118. In some embodiments, the shaft members 102 and 104 are of a length that would allow the user to place the adjustable portable headrest 100 on the floor and the pads 108 would be under the person's feet.

The attachment means, may be, but not limited to adhesive, welding, or the like. In additional embodiments, the various elements are detachable from one another to allow for the person to replace the elements if broken or swapping out the cushion 118 for other models and sizes. The elements may de detachable as well for traveling purposes to create a compact design.

The invention is inclusive of combinations of the embodiments or embodiments described herein. References to "a particular embodiment" or "embodiment" and the like refer to features that are present in at least one embodiment of the invention. Separate references to "an embodiment" or "particular embodiments" or "embodiments" or the like do not necessarily refer to the same embodiment or embodiments; however, such embodiments are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention. The present invention shall be easily carried out by an ordinary skilled person in the art, and any modifications and changes are deemed to be within the scope of the present invention.

This written description uses examples to disclose the invention, including the best mode, and also to enable any person skilled in the art to practice embodiments of the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

What is claimed is:

1. A portable adjustable headrest comprising:
a base member having a first surface, a second surface, and a third surface, wherein a receiving orifice is protruding from the first surface, a first attachment member is affixed to the second surface, and a second attachment member is affixed to the third surface;
a first elongated pad, wherein the first elongated pad is rotationally attached to the first attachment member;
a second elongated pad, wherein the second elongated pad is rotationally attached to the second attachment member;
a hollow outer shaft having a central axis, wherein the hollow outer shaft is inserted into the receiving orifice of the base member;
an inner shaft having a first end and a second end and a central axis, configured to fit securely within the outer shaft in a telescopic relationship;
a locking mechanism coupled to the inner shaft and the hollow outer shaft, wherein the inner shaft is rotated about the central axis of the hollow outer shaft to engage and disengage the locking mechanism, wherein when the inner shaft is rotated in a first direction about the central axis, the locking mechanism is engaged and when rotated in a direction opposite the first direction, the locking mechanism becomes disengaged;
a cushion base affixed to the first end of the inner shaft, wherein the cushion base has a curved elongated surface;
a cushion situated on the elongated surface of the cushion base, wherein the cushion is curved substantially similar to the curvature of the cushion base, wherein the cushion is made from a high-density foam;
a cover secured around the cushion and elongated surface of the cushion base, and made from a high density foam; and
a grip having a hollow core and an external surface, wherein the grip is made from a foam cushioning material and has a predetermined contour on the exterior surface and is sized to securely fit over the hollow outer shaft.

2. The portable adjustable headrest of claim 1, wherein the locking mechanism when engaged limits the rotation about the center axis and telescopic mobility of the inner shaft thereby securing the inner shaft in a specific position.

3. The portable adjustable headrest of claim 1, wherein the cover has a detachable locking mechanism to secure the cushion and the elongated surface of the cushion base within the cover.

4. The portable adjustable headrest of claim 1, wherein the hollow outer shaft and the inner shaft are substantially equal lengths.

5. A portable adjustable headrest comprising:
a base member having a receiving orifice and two mounting points on opposing sides of the receiving orifice;
elongated pads rotatably attached to the mounting points on the base member
a hollow outer shaft having a first end and a second end, wherein the first end of the hollow outer shaft is fitted within the receiving orifice;
an inner shaft having a first end and a second end, wherein the inner shaft is inserted into the second end of the hollow outer shaft;
a locking mechanism coupled to the inner shaft and the hollow outer shaft, wherein the inner shaft is rotated about the central axis of the hollow outer shaft to engage and disengage the locking mechanism, wherein when the inner shaft is rotated in a first direction about the central axis, the locking mechanism is engaged and when rotated in a direction opposite the first direction, the locking mechanism becomes disengaged;
a cushion base attached to the first end of the inner shaft, wherein the cushion base has an elongated curved surface extending outwardly;
a cushion situated on the elongated surface of the cushion base, and made from a high density foam; and
a cover which is secured over the cushion and elongated surface of the cushion base, wherein the cover has a securing means; and
a handle grip having a hollow core and an external surface, wherein the elongated body is made from a cushioning material and has a predetermined contour on the exterior surface and is sized to securely fit over the hollow outer shaft below the locking mechanism and above the base member.

6. The portable adjustable headrest of claim 5, wherein the cushion and the cushion base have substantially mating contoured surfaces.

7. The portable adjustable headrest of claim 5, wherein the hollow outer shaft and the inner shaft are substantially equal lengths.

8. The portable adjustable headrest of claim 5, wherein the base member and the outer hollow tube are detachably engaged with one another.

9. A portable adjustable headrest comprising:
a base member having a receiving orifice, a first connector, a second connector, wherein the first connector and the second connector are on substantially opposite sides of the receiving orifice;
a first elongated pad, wherein the first elongated pad is attached to the first connector, wherein the first elongated pad is able to rotate about the first connector from a first position to a second position;
a second elongated pad, wherein the second elongated pad is attached to the second connector, wherein the first elongated pad is able to rotate about the second connector from a first position to a second position;
a hollow outer shaft having a first end, a second end, and a central axis, wherein the first end of the hollow outer shaft is inserted into the receiving orifice of the base member;
an inner shaft having a first end and a second end, wherein the first end of the inner shaft is configured to fit within the second end of the hollow outer shaft;
a locking mechanism coupled to the inner shaft and the hollow outer shaft, wherein the inner shaft is rotated about the central axis of the hollow outer shaft to engage and disengage the locking mechanism, wherein when the inner shaft is rotated in a first direction about the central axis, the locking mechanism is engaged and when rotated in a direction opposite the first direction, the locking mechanism becomes disengaged;
a cushion base affixed to the second end of the inner shaft, wherein the cushion base has a curved elongated surface;
a cushion situated on the elongated surface of the cushion base, wherein the cushion is contoured to substantially match the curvature of the cushion base, and made from a high density foam;
a cover secured around the cushion and elongated surface of the cushion base, wherein the cover has a releasable attachment means; and
an elongated body having a hollow core and an external surface, wherein the elongated body is made from a foam material and has a predetermined contour on the exterior surface and is sized to securely fit over the hollow outer shaft between the first end and the second end.

10. The portable adjustable headrest of claim 9, wherein the locking mechanism is engaged when the inner shaft is rotated from a first position to a second position about the central axis.

* * * * *